United States Patent [19]

Sasanuma

[11] Patent Number: 5,572,330
[45] Date of Patent: Nov. 5, 1996

[54] IMAGE PROCESSING APPARATUS AND METHOD

[75] Inventor: Nobuatsu Sasanuma, Yamato, Japan

[73] Assignee: Canon Kabushiki Kaisha, Tokyo, Japan

[21] Appl. No.: 415,575

[22] Filed: Apr. 3, 1995

Related U.S. Application Data

[63] Continuation of Ser. No. 885,773, May 20, 1992, abandoned.

[30] Foreign Application Priority Data

May 21, 1991 [JP] Japan ................................. 3-115913
May 21, 1991 [JP] Japan ................................. 3-115914

[51] Int. Cl.$^6$ ................................................ G03G 15/00
[52] U.S. Cl. ........................ 358/298; 358/302; 347/133; 399/38
[58] Field of Search .................................. 358/302, 504, 358/298, 518, 461; 347/129, 131, 133, 240, 251; 355/208

[56] References Cited

U.S. PATENT DOCUMENTS

| | | | |
|---|---|---|---|
| 4,888,636 | 12/1989 | Abe ............................................. | 358/80 |
| 4,914,459 | 4/1990 | Mama et al. ............................. | 346/160 |
| 5,189,441 | 2/1993 | Fukui et al. ............................. | 346/160 |
| 5,194,878 | 3/1993 | Murakami et al. ..................... | 346/108 |
| 5,206,686 | 4/1993 | Fukui et al. ............................. | 355/208 |
| 5,258,783 | 11/1993 | Sasanuma et al. ..................... | 346/157 |

FOREIGN PATENT DOCUMENTS

477730  4/1992  European Pat. Off. ......... H04N 1/40

OTHER PUBLICATIONS

Patent Abstracts of Japan, abstract for Kokai 1-181284 (Jul. 1989).
Patent Abstracts of Japan, abstract for Kokai 60-165667 (Aug. 1985).

*Primary Examiner*—Brian W. Brown
*Assistant Examiner*—Randy W. Gibson
*Attorney, Agent, or Firm*—Fitzpatrick, Cella, Harper & Scinto

[57] ABSTRACT

An image processing apparatus for processing gradation images which includes a pattern forming circuit for forming a predetermined pattern on a medium. A detecting device detects the predetermined pattern on the medium and generates a detection signal. A processing circuit processes the input image signal in accordance with the detection signal and outputs a reproduction signal. A setting device manually sets an image signal processing condition of the processing circuit, thereby accomplishing optimization of the image processing.

20 Claims, 14 Drawing Sheets

|   | -4   | -3   | -2   | -1   | -0   | +1   | +2   | +3   | +4   |
|---|------|------|------|------|------|------|------|------|------|
| Y | 1.70 | 1.65 | 1.60 | 1.55 | 1.50 | 1.45 | 1.40 | 1.35 | 1.30 |
| M | 1.30 | 1.25 | 1.20 | 1.15 | 1.10 | 1.05 | 1.00 | 0.95 | 0.90 |
| C | 1.40 | 1.35 | 1.30 | 1.25 | 1.20 | 1.15 | 1.10 | 1.05 | 1.00 |
| K | 1.45 | 1.40 | 1.35 | 1.30 | 1.25 | 1.20 | 1.15 | 1.10 | 1.05 |

FIG. 20A

| 60 | 56 | 52 | 48 | 40 | 32 | 24 | 16 | 17 | 28 | 36 | 44 | 49 | 53 | 57 | 61 |
|----|----|----|----|----|----|----|----|----|----|----|----|----|----|----|----|
| 47 | 39 | 31 | 23 | 12 | 8  | 4  | 1  | 2  | 7  | 11 | 15 | 18 | 25 | 33 | 41 |
| 43 | 35 | 27 | 22 | 14 | 10 | 6  | 3  | 1  | 5  | 9  | 13 | 19 | 29 | 37 | 45 |
| 63 | 59 | 55 | 51 | 46 | 38 | 30 | 21 | 20 | 26 | 34 | 42 | 50 | 54 | 58 | 62 |

4 DOTS × 4 DOTS

FIG. 20B

| 14 | 15 | 23 | 31 | 37 | 45 | 53 | 61 | 57 | 49 | 41 | 33 | 29 | 21 | 13 | 12 |
|----|----|----|----|----|----|----|----|----|----|----|----|----|----|----|----|
| 58 | 50 | 42 | 34 | 24 | 16 | 4  | 1  | 1  | 5  | 18 | 26 | 38 | 46 | 54 | 62 |
| 56 | 48 | 40 | 32 | 28 | 20 | 9  | 8  | 10 | 11 | 22 | 30 | 36 | 44 | 52 | 60 |
| 6  | 7  | 19 | 27 | 39 | 47 | 55 | 63 | 59 | 51 | 43 | 35 | 25 | 17 | 3  | 2  |

4 DOTS × 4 DOTS

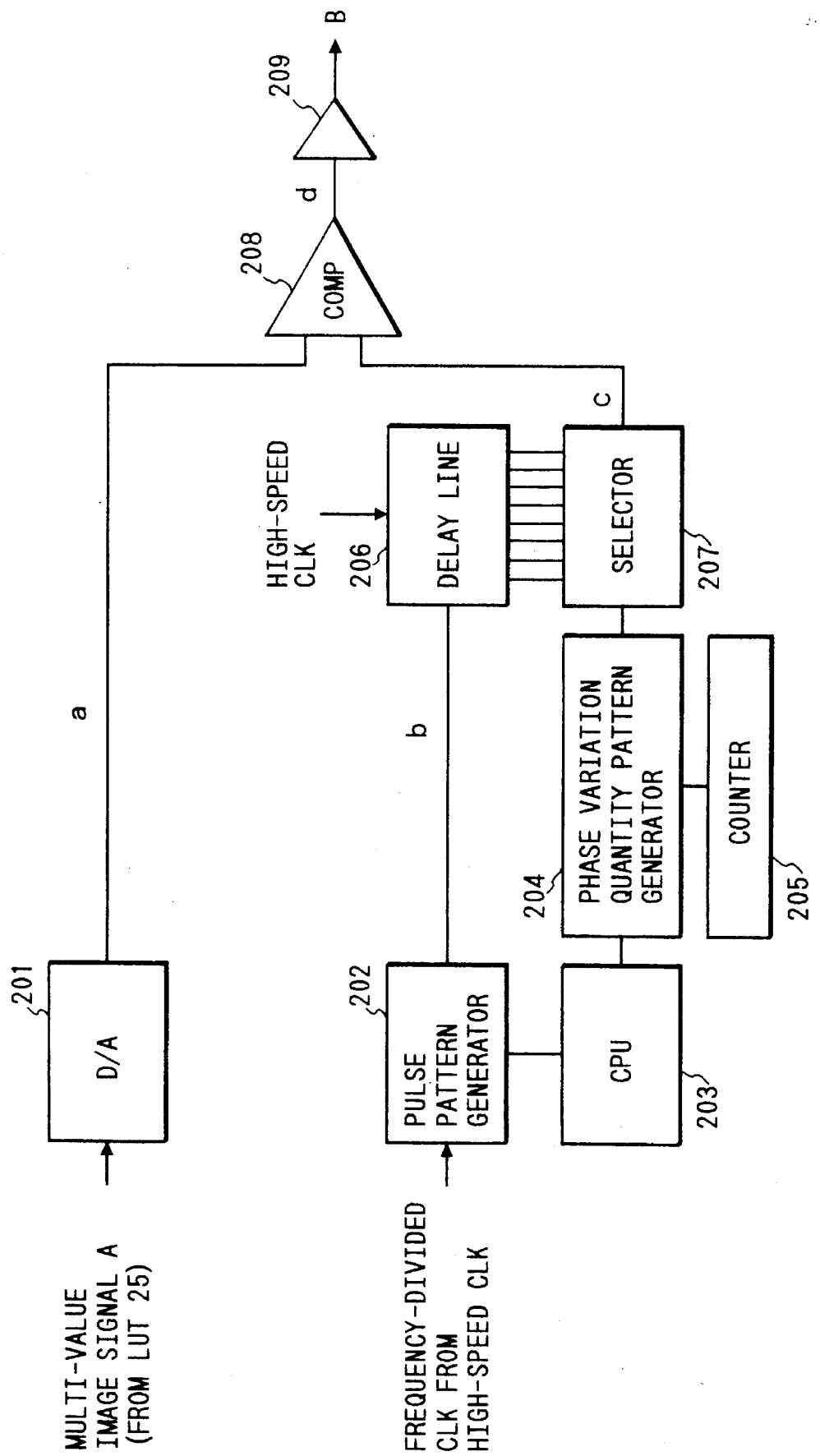

IMAGE PROCESSING APPARATUS AND METHOD

This application is a continuation of application Ser. No. 07/885,773 filed May 20, 1992, now abandoned.

BACKGROUND OF THE INVENTION

1. Field of the Invention

The present invention relates to an image processing apparatus for processing a gradation image.

2. Related Background Art

A known approach for attaining the stability of an image is by forming a chrominance pattern on a photosensitive body, and reading the density of its pattern and feeding back image forming conditions such as γ-compensation.

However, in the conventional example indicated above, since it was impossible to take into account the deviation relating to a machine body, such as variations in sensor sensitivity and fluctuations in the distance between a sensor and an object to be measured, the level at which the image is stabilized may differ from machine to machine.

In particular, in the cases of copiers of electrophotographic system, as well as printers (for example, ink jet printer) or other systems, various characteristics of a processing means such as photosensitive body and developer may vary with the number of times it is used.

Besides, in the conventional example described above, when a gradation reproduction method for a screen angle of pulse width modulation is changed depending on modes such as character-line block mode and photography mode, for example, required according to the kind of manuscript, the chrominance pattern on an image carrier differs in its reflection characteristic depending on various gradation reproduction methods, so that it was not possible to correctly detect density in different modes so long as the same density detecting method is used. As the result, it was impossible to constitute an accurate feedback system.

Needless to say, a reflection characteristic of the chrominance pattern on the image carrier, such as photosensitive body, also differs depending on image forming material such as toner or the like.

SUMMARY OF THE INVENTION

Accordingly, the present invention has been made to correct the abovementioned drawbacks in the prior art, and one object of which is to provide an image processing apparatus including means for optimizing its image processing.

It is another object of the present invention to realize such optimization process utilizing a simple manipulation.

In order to accomplish such objects as mentioned above, according to one preferred embodiment, there is disclosed an image processing apparatus comprising pattern forming means for forming a predetermined pattern on a medium, detecting means for detecting the predetermined pattern on the medium and generating a detection signal, processing means for processing input image signals in accordance with the detection signal and outputting a reproduction signal, and setting means for manually setting an image signal processing condition of the processing means.

It is a further object of the present invention to appropriately convert a density characteristic of the image.

In order to achieve such an object as pointed out above, according to another preferred embodiment of the present invention, there is disclosed an image processing apparatus comprising input means for inputting image data, converting means for converting a density characteristic of the image data, generating means for generating pattern data representing a predetermined pattern, image forming means for forming an image on a recording medium in accordance with the converted image data and pattern data, detecting means for detecting the predetermined pattern on the recording medium and generating a detection signal, setting means for manually setting a parameter for conversion by the converting means, and control means for controlling a conversion characteristic of the converting means based on the detection signal and the parameter.

It is yet another object of the present invention to provide an image processing optimization system constituted by taking gradation expression processing into account.

For such objects as mentioned above, according to yet another preferred embodiment of the present invention, there is also disclosed an image processing apparatus comprising pattern forming means for forming a predetermined pattern on a medium, density detecting means for detecting the density of the pattern formed by the pattern forming means, and gradation control means for performing gradation control according to the density detected by the density detecting means, to be characterized in that the density detecting means comprises a light source and light reception elements, measures the reflected light of the pattern formed on the medium, and performs arithmetic processing for conversion according to a gradation reproduction method for the gradation control means, upon converting the measured value into the corresponding density value.

BRIEF DESCRIPTION OF THE DRAWINGS

The foregoing and other objects, features and advantages of the present invention will become more apparent from the following detailed description in conjunction with the drawings in which.

3

Figure 14:
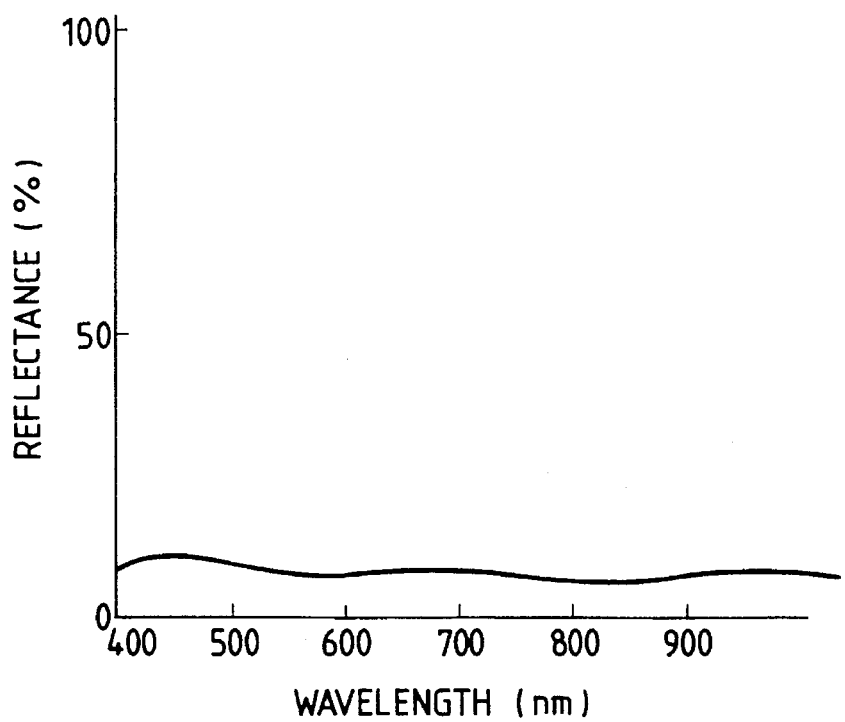
Figure 15:
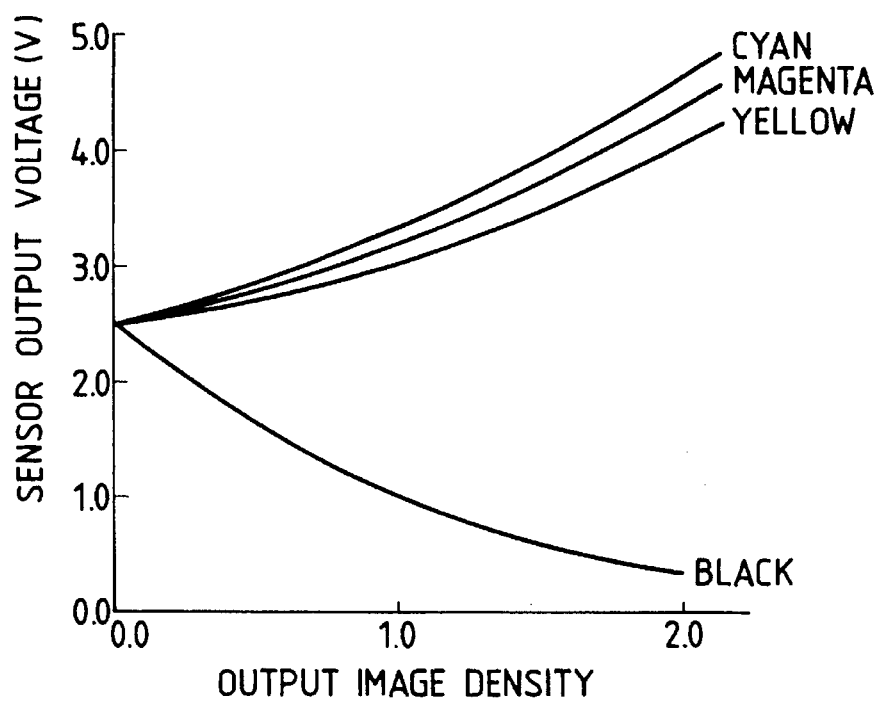
Figure 16:
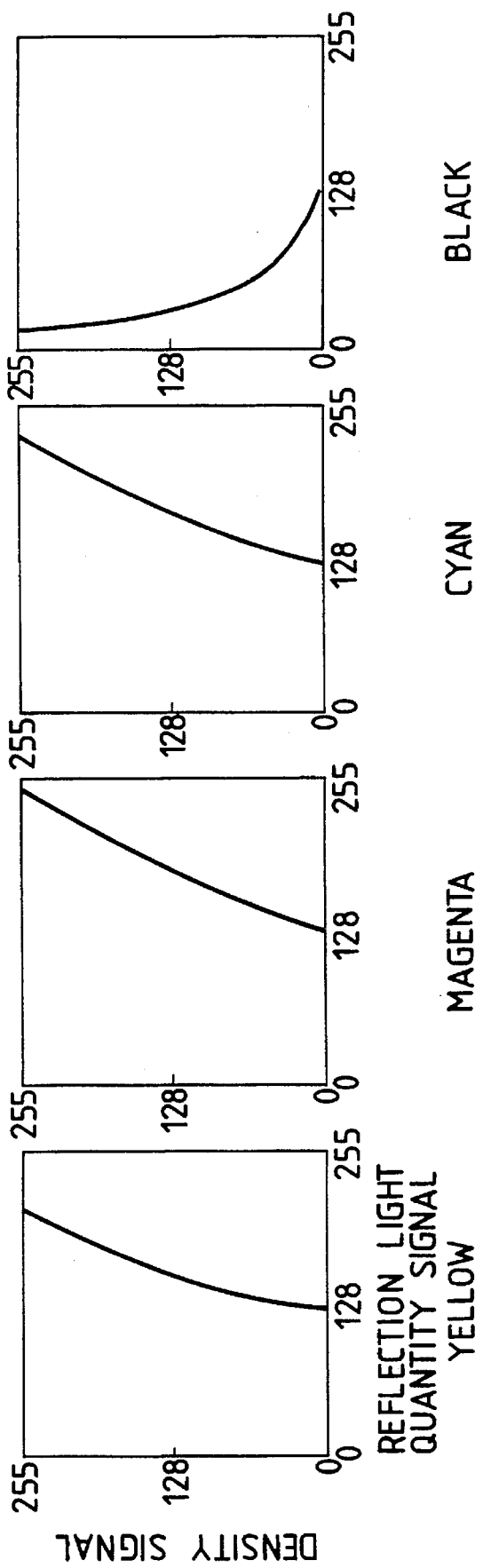
Figure 17:
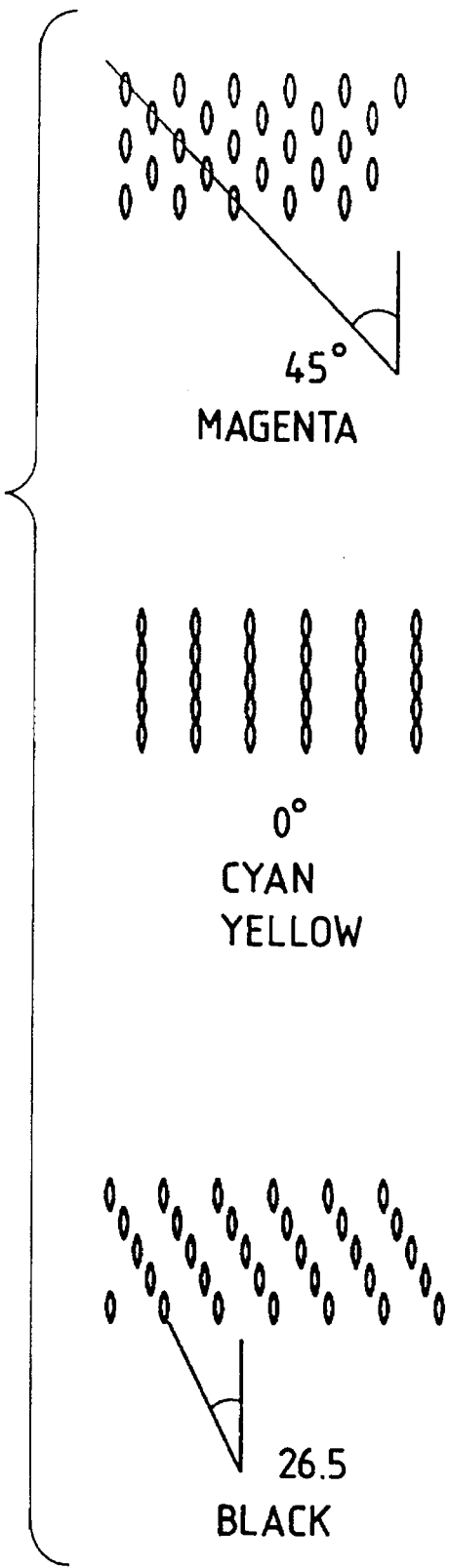
Figure 18:
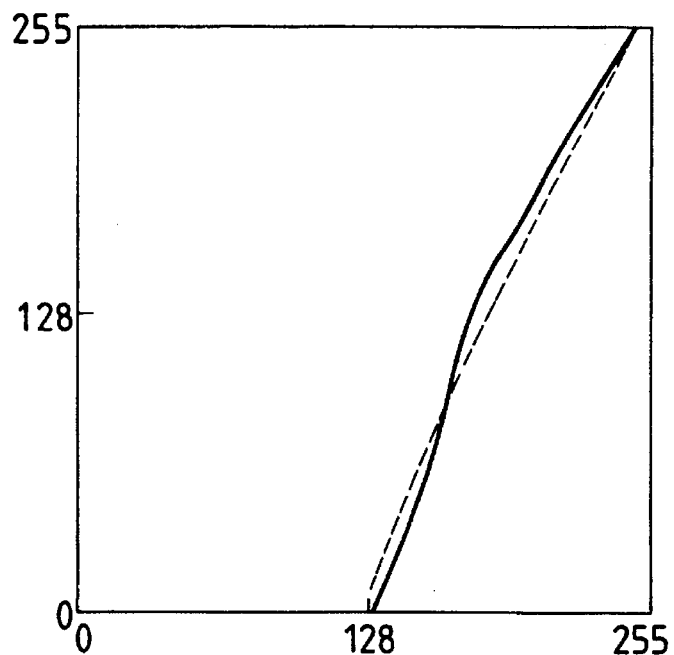
Figure 19:
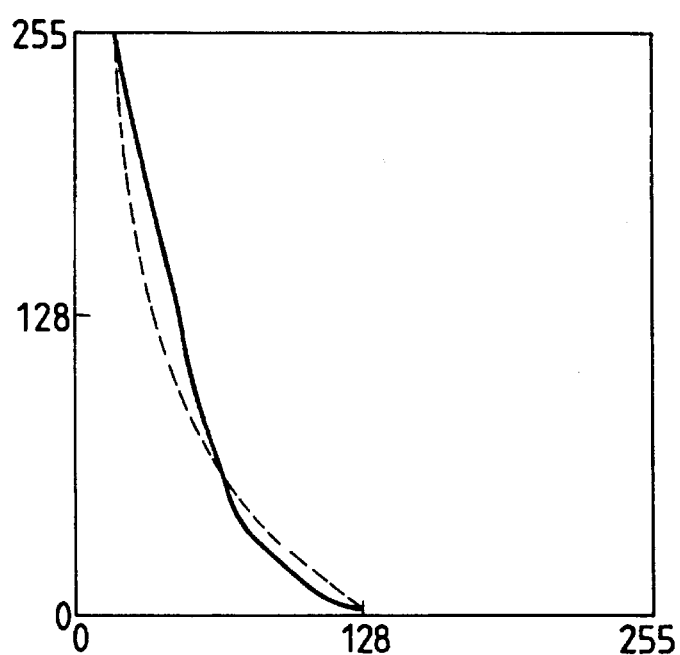
Figure 21:
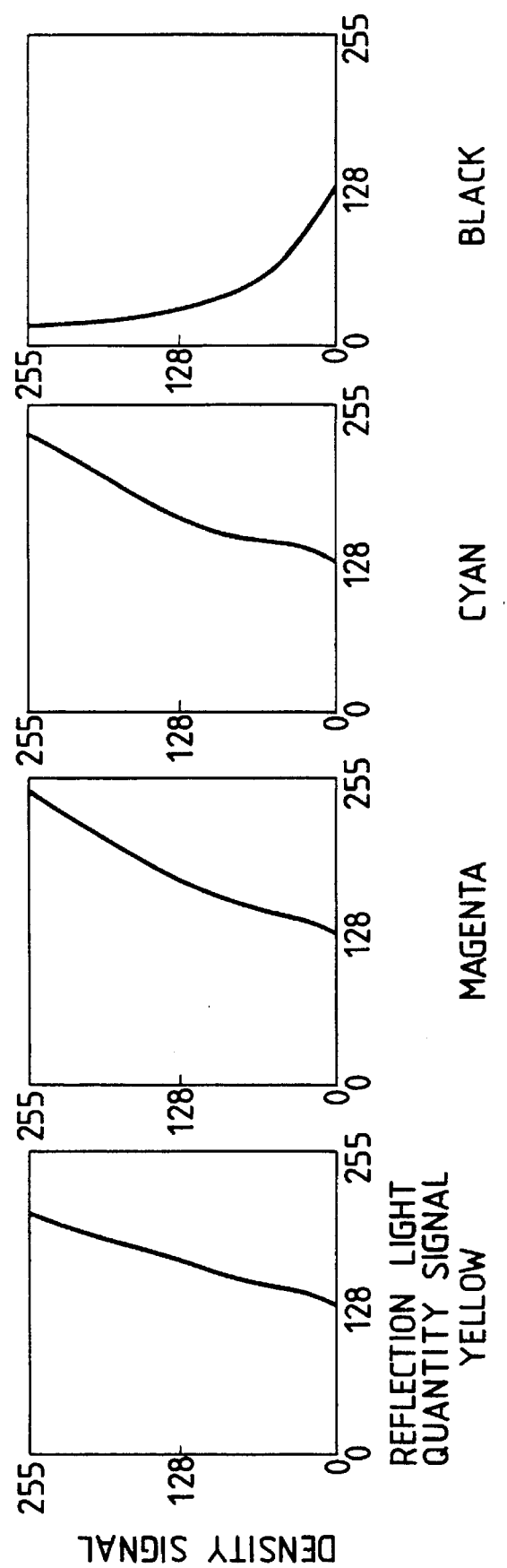

FIG. 12 is a diagram illustrating a display pattern on a console panel;

FIG. 13 is a diagram showing the correspondence among respective color coefficients;

FIG. 14 is a diagram illustrating one example of a black (one-component magnetism)-toner spectral characteristic;

FIG. 15 is a diagram illustrating one example of density signal level versus sensor outputs;

FIG. 16 is a diagram showing a table used for converting a reflection light quantity signal of each color into a density signal;

FIG. 17 is a diagram showing an alignment angle for constitutional pixels;

FIG. 18 is a diagram showing a table used for converting a reflection light quantity signal of magenta into a density signal;

FIG. 19 is a diagram showing a table used for converting a reflection light quantity signal of black into a density signal;

FIGS. 20A and 20B are diagrams showing dither matrix patterns;

FIG. 21 is a diagram showing tables used for converting reflection light quantity signals for respective color into density signals; and FIG. 22 is a diagram useful for explaining the operation of a pulse width modulation circuit.

DETAILED DESCRIPTION OF THE PREFERRED EMBODIMENTS

[Embodiment: 1]

One preferred embodiment of the present invention will be herein explained in detail by referring to the annexed drawings.

It will be understood that the preferred embodiment will be explained by way of an electrophotographic system, for example, but the present invention is also applicable to other types of image forming devices such as ink jet printer, silver salt photographic printer or thermal transcription printer and others.

Figure 1:
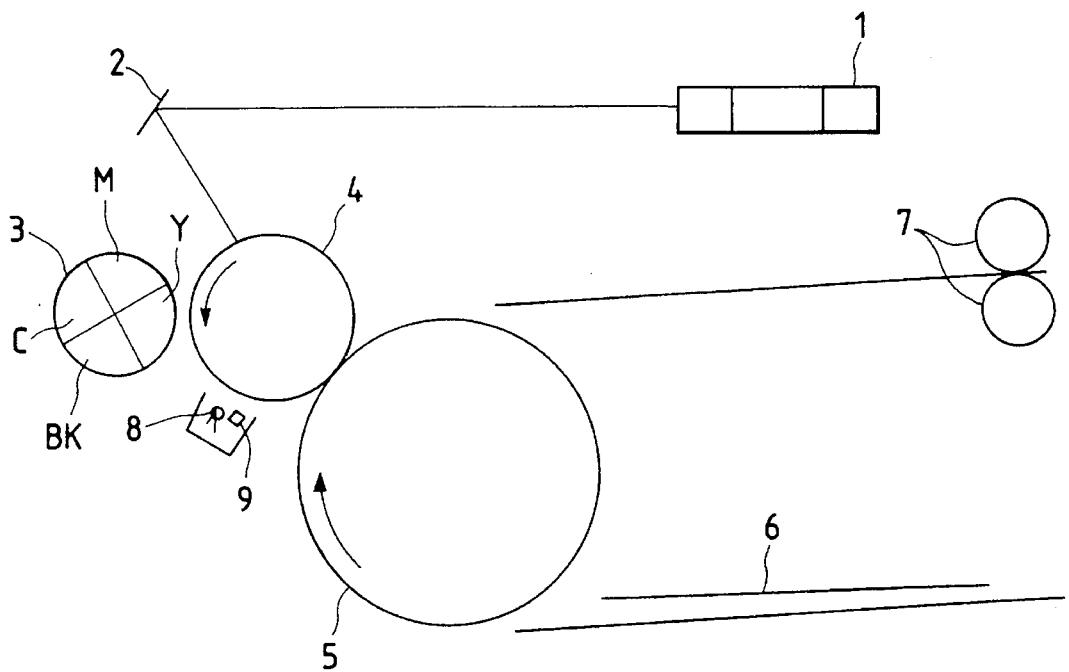
FIG. 1 is a diagram illustrating an electrophotographic system which exemplifies one embodiment of the present invention.

FIG. 1 shows one of the embodiments that are considered suitable at present for explaining the principles of the present invention. In the embodiment, an image signal is converted into laser light by use of a laser driver and a laser light source which are not indicated in the drawing, and this laser light is reflected by a polygon mirror 1 and a mirror 2 and irradiated on a photosensitive body drum 4. The photosensitive drum 4 on which a latent image is formed by the scanning of laser light is rotated in the direction indicated by an arrow. Then, development for each color is performed by a rotary developing device 3 (FIG. 1 shows the development by a yellow toner.).

A transfer paper 6 is wound around a transcription drum 5 and rotated four times to complete a sequence of transcribing operation for four kinds of toners in the order of Y (yellow), M (magenta), C (cyan) and Bk (black).

When the transcribing operation is complete, the transfer paper 6 is separated from the transcription drum 5 and fixed by means of fixing roller pairs 7 to obtain a color picture print.

A LED 8 is used as irradiation means for emitting near infrared light having a major wavelength of approximately 960 nm, and a CCD sensor 9 is used for reading a toner image formed on the photosensitive body drum 4.

4

Figure 2:
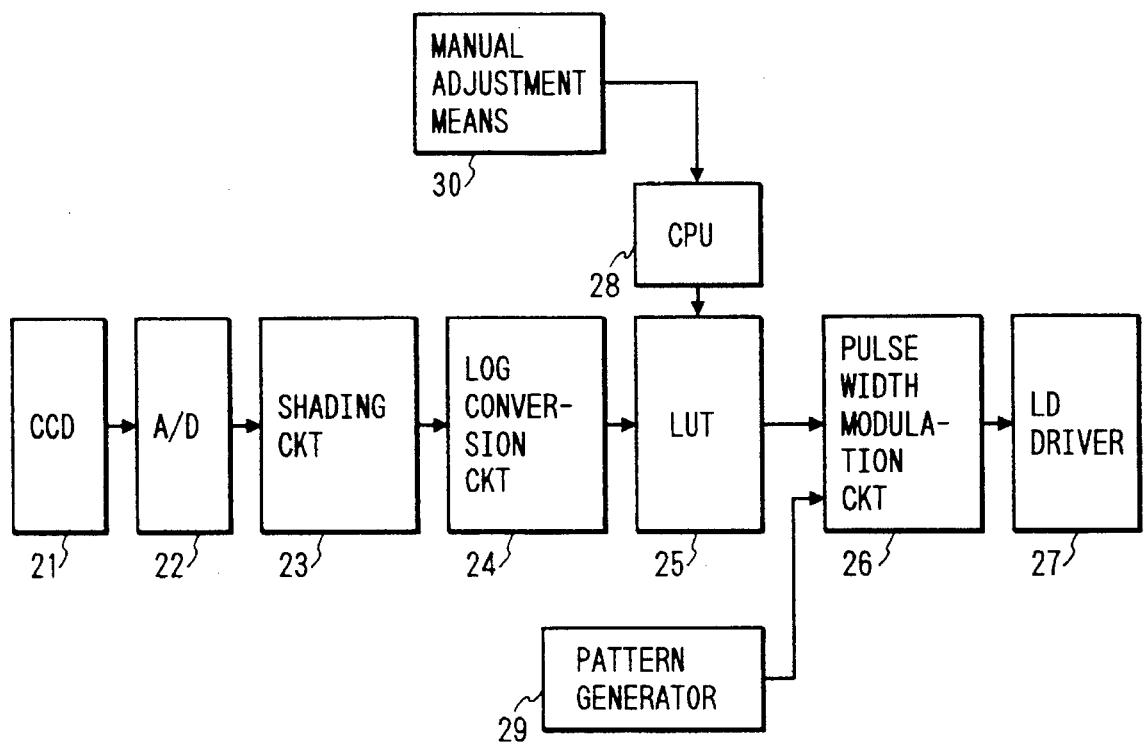
FIG. 2 is a block diagram showing a processing circuit for processing electric signals from a CCD.

Referring now to FIG. 2, there is shown an image signal processing circuit for obtaining a gradation image according to the present invention.

A luminance signal representing the original image obtained at a CCD line sensor 21 through photoelectric conversion is converted into a digital luminance signal by means of an A/D conversion circuit 22.

Variations in sensitivity of the respective CCD elements in the CCD sensor 21 are modified at a shading circuit 23 based on the obtained digital luminance signals, and the modified luminance signals are density-converted by a LUT (look-up-table) 25 composed of a RAM in such a manner that γ-characteristics of the printer at the time of initial setting are just the same in the original image density and an output image.

The signal whose γ-characteristics are converted by means of the LUT 25 is pulse-width modulated by a pulse-width modulation circuit 26 and then output as laser light from a LD driver 27. A CPU 28 rewrites the contents of the LUT 25 based on the results of arithmetic operation to be described later. Fine adjustment of the γ-characteristic of the LUT 25 set by a feedback system can be performed manually by manual adjustment means 30.

Figure 3:
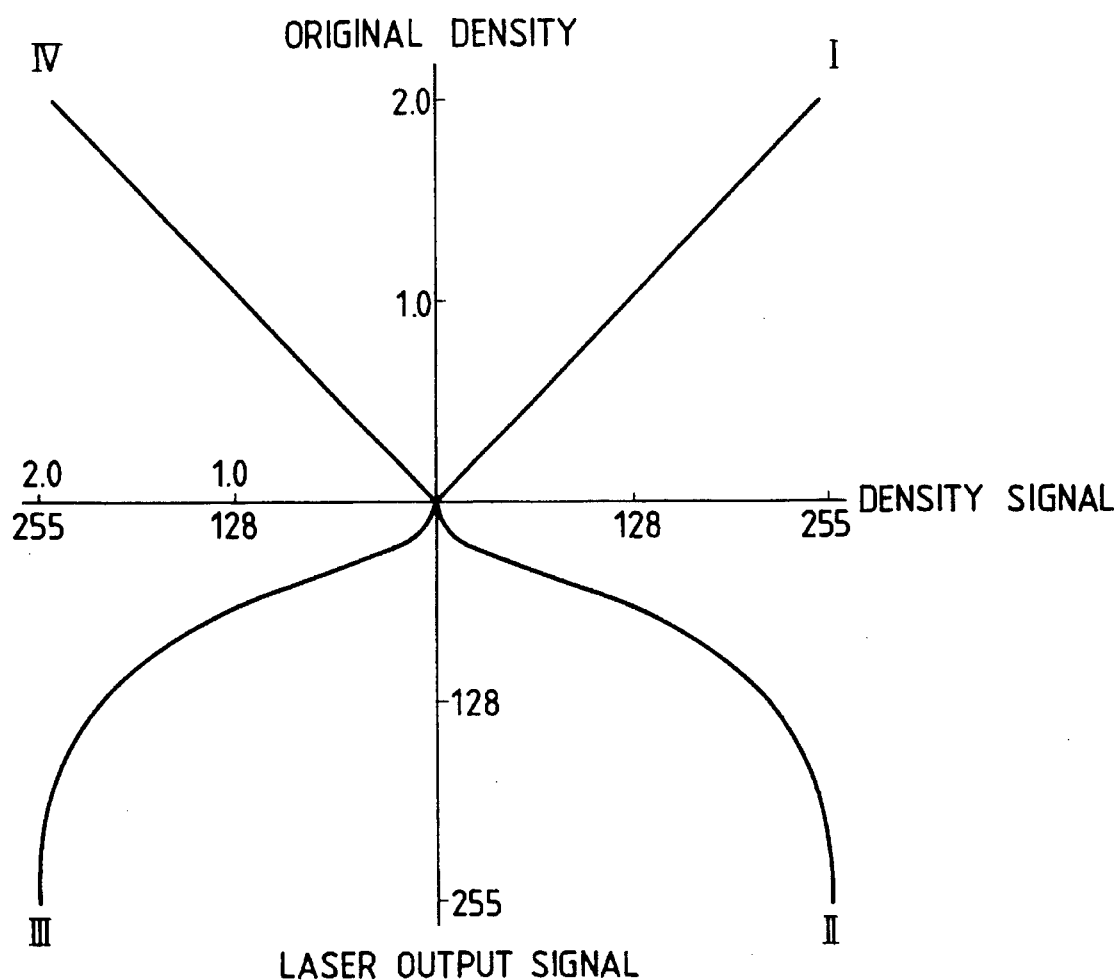
FIG. 3 is a quadrant chart diagram showing a gradation reproduction characteristic.

FIG. 3 is a quadrant chart showing a situation in which gradation is reproduced.

The first quadrant (I) shows a conversion characteristic of an image reader portion including the CCD 21 used for converting the original density into a density signal. The second quadrant (II) shows a conversion characteristic of the LUT 25 used for converting a density signal into a laser output signal. The third quadrant (III) shows a reproduction characteristic of the printer used for converting a laser output signal into output density. The fourth quadrant (IV) shows a total gradation characteristic of this image forming device representing the relationship of the output density from the original density.

As seen from the drawing, since the number of gradations is processed with a digital signal of 8 bits, there are 256 gradations.

In this image forming device, in order to make the gradation characteristic of the fourth quadrant (IV) linear, non-linearity of the printer characteristic in the third quadrant (III) is corrected by the LUT 25 in the fourth quadrant (IV).

The table contents of LUT 25 are generated from the results of arithmetic operation to be described later.

The signal after having been converted by the LUT 25 is modulated by the pulse width modulation circuit 26 to a signal corresponding to dot-width and is applied to the laser driver 27. The latent image with a gradation characteristic due to changes in dot area is formed on the photosensitive body drum 4 using laser scanning, and the gradation image can be obtained through processes of development, transcription and fixing.

In addition, the image forming device contains a test pattern generator 29 for outputting a pattern signal used for forming a test pattern on the photosensitive body drum 4.

Figure 4:
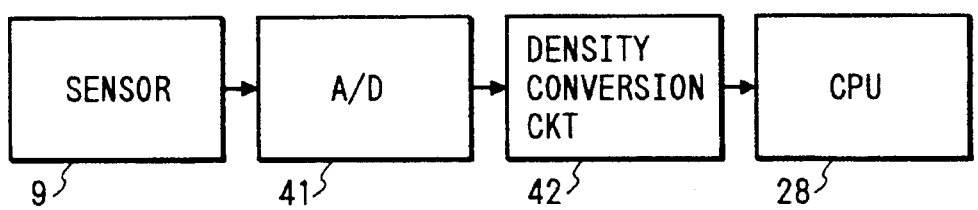
FIG. 4 is a block diagram showing a processing circuit for processing electric signals from a sensor.

Referring now to FIG. 4, there is shown a processing circuit for processing the signals from the sensor 9.

The near infrared light irradiated from the LED 8 strikes the gradation pattern formed on the photosensitive drum 4 by the test pattern generator 29, and is reflected back to the sensor 9. The reflected light is converted into a luminance signal proportional to an amount of reflected light by the sensor 9, and the luminance signal is converted into a digital luminance signal by means of an A/D conversion circuit 41, and then is converted into a density signal by a density conversion circuit 42. Finally, the CPU 28 implements arithmetic operation based on the density signal provided from the density conversion circuit 42.

As color toners included in this embodiment, yellow, magenta and cyan are used and dispersed individually. A styrene-series copolymer resin is used as a binder.

A black toner is obtained by mixing the three color toners mentioned above.

In the formation of color toner images, a two-component developing system is employed because it is particularly advantageous for color fineness and transmittency.

As seen from the spectral characteristics of yellow, magenta, cyan and black toners indicated in this order in FIGS. 5–8, the reflectivity of near infrared light (960 nm) is more than approximately 80%.

From these relationship, it can be understood that the amount of reflected light will be increased as the optical density or an amount of toner on the photosensitive body drum increases.

As offset adjustment for the sensor 9, the signal indicative of the amount of reflected light obtained in a state where no toner is provided on the photosensitive body drum is set to a level of 10.

Conversion of the amount of reflected light to density is performed according to the following equation;

$$D = k \log (I/IO) \quad (1)$$

where IO is an intensity of light radiated from the LED 8, I is an intensity of light received by the sensor 9, k is a coefficient, and D shows optical density obtained by normalizing a density of 1.8 into 225 levels.

Assuming that the amount of light radiated from the LED 8 is set to be the same all of the time, Equation (1) can be rewritten as follows provided that k is another coefficient.

$$D = k \log I - K \quad (2)$$

Since the reflection characteristic somewhat differs from color to color, the coefficient k used in Equation (1) must be changed for each color.

In order to obtain "D=0", K is set to 125 (yellow), 90 (magenta), 100 (cyan) and 105 (black), respectively, for the case where I=10.

In addition, the photosensitive drum 4 is an OPC drum, and the reflectivity of near infrared light (960 nm) is approximately 40%. However, instead of the OPC drum, other drums such as an amorphous silicon type drum or the like may be used.

Figure 9:
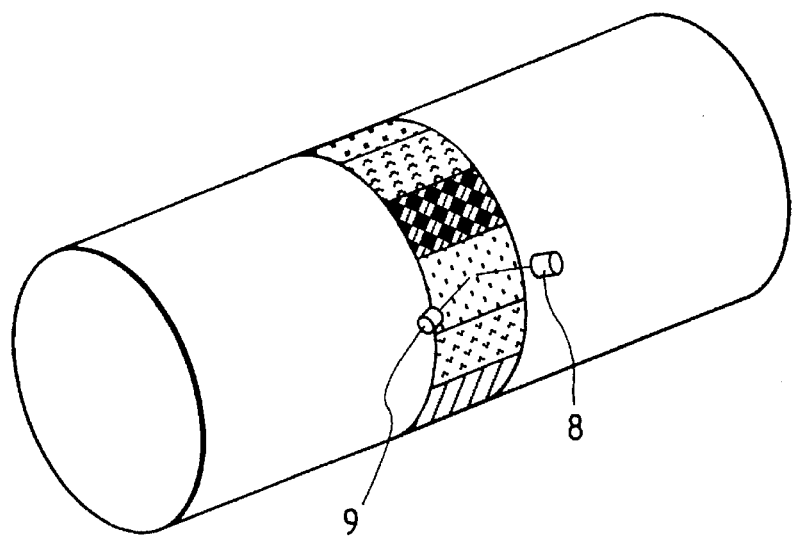
FIG. 9 is a diagram illustrating one example of a location on a drum where a specific gradation pattern patch is formed.

Before effecting copying operation, a specific gradation pattern (as laser output signal in this embodiment, a pattern of 10 gradations consisting of 16, 32, 48, 64, 80, 96, 112, 128, 144 and 160 levels is output) is formed continuously in the peripheral direction of the drum as indicated in FIG. 9, and measured by using the LED 8, the sensor 9 and an appropriate timing to obtain a series of density values. The printer characteristic indicated in the third quadrant (III) in FIG. 3 representing its gradation characteristic is directly obtained with high accuracy by transcribing the series of density values on a copying paper without a need for a fixing process.

The contents of the LUT 25 used for correcting the printer characteristic can be readily derived from the printer characteristic. In short, the LUT 25 can be obtained by reversing the input-output relationship of the printer characteristic.

It is generally known that various characteristics of the copier of an electrophotographic system varies depending on the number of copies made. This is considered to be attributable to a number of causes such as fatigue of the photosensitive body due to light, abrasion of the superficial layer of the photosensitive body due to a cleaning blade abutting thereto, lowering of a tribo-provision capability for a developer and so on.

Accordingly, an optimum gradation reproduction characteristic can always be obtained by performing the abovementioned operation periodically prior to a copying operation (for example, when the power supply is switched on) and constructing the LUT 25 step by step.

However, upon stabilizing the density and gradation property through the abovementioned control operation, if the coefficient for each color in Equation (2) is fixed, it was found that their characteristics vary from machine to machine as the result of variations of the sensor 9.

In order to supress the variations in the density and gradation property, the system of the present invention is so configured that the abovementioned coefficient can be set by means of the consol panel (manual adjustment means 30) on the machine body.

Figure 10A:
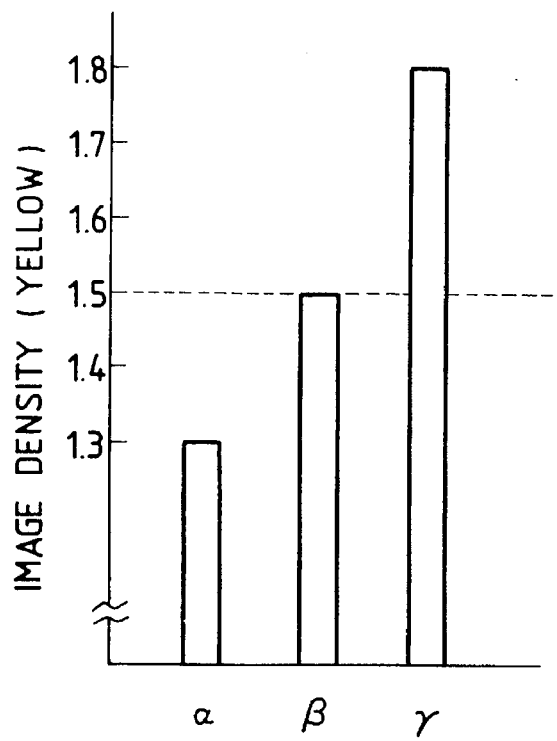
FIGS. 10A and 10B are diagrams showing the density differences between different machines.
Figure 10B:
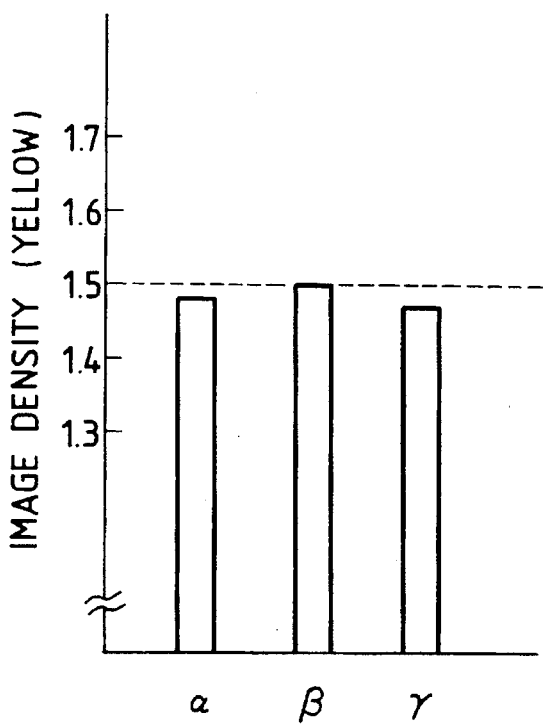

In FIGS. 10A and 10B, there are demonstrated changes in density obtained when the present invention is carried out. As can be clearly seen from FIG. 10A in which there is shown a set of density (D) for three machines ($\alpha$, $\beta$, $\gamma$) obtained by carrying out gradation control using a feedback system when a coefficient k for yellow is set to 125 provided that a target value in density is set as D=1.50, there will be obtained different density characteristics for the machines $\alpha$, $\beta$, $\gamma$ as D=1.3, D=1.5 and D=1.8, respectively.

On the contrary, the target values in density for all machines can be held within 1.5±0.05, as shown in FIG. 10B, by manually setting the coefficient k for the machine $\alpha$ to 120 and the coefficient k for the machine $\gamma$ to 135, by use of the console panel.

[Embodiment: 2]

In the first embodiment, the operation expression was used as a means for converting the amount of reflected light from a specific patch on the photosensitive body drum into the corresponding optical density. However, it is desirable to accelerate the processing speed in order to shorten a waiting time required for constructing a LUT.

In general, since a numerical operation expression used in the conventional CPU is in the form of a logarithm, the processing speed thereof is slow. To increase an execution speed, it is necessary to add a co-processor for numerical operations, thus leading to an undesirable increase in cost in view of hardware design.

Figure 11:
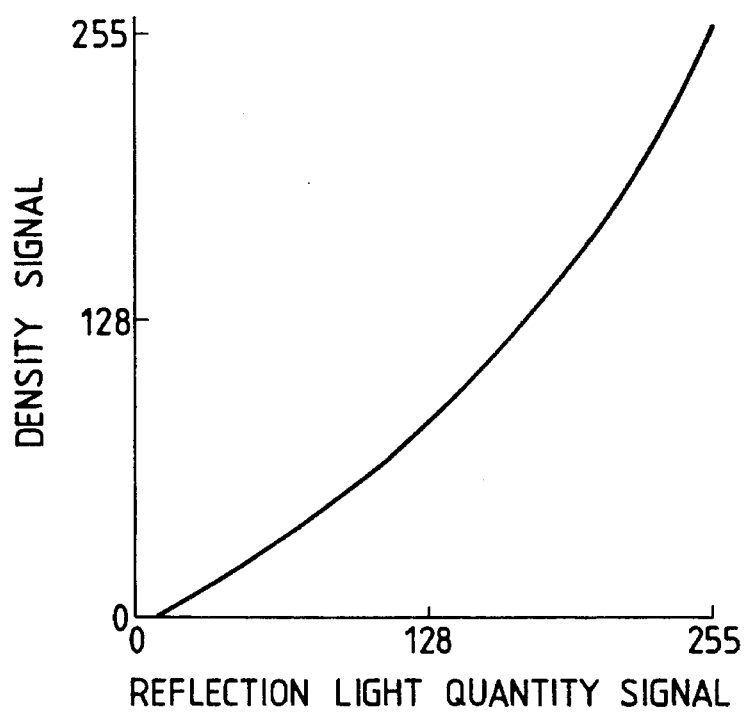
FIG. 11 is a diagram showing a characteristic curve for a LUT used for converting a reflection light quantity signal into a density signal.

Referring now to FIG. 11, there is shown a characteristic curve for a LUT comprising a RAM as used in this embodiment. As understood from the curve, the signal indicative of the amount of reflected light converted to a digital signal of 8 bits will be converted into a density signal of 8 bits wherein a level of 225 corresponds to an optical density of 1.8.

In addition, since the reflection characteristic differs from color to color, a reflection light quantity signal is multiplied by a certain coefficient before the density conversion is performed by the LUT.

As a result, average values for the machine were 1.50 for yellow, 1.10 for magenta, 1.20 for cyan and 1.25 for black.

Like the first embodiment, the processing speed can be raised by setting the above mentioned coefficients to appropriate values for respective machines by use of the consol panel in correspondence with the variations in density after gradation control. As the results of such processing, the variations in the density and gradation property can also be reduced.

[Embodiment: 3]

In the first and second embodiments, the setting of coefficients was directly conducted by an operator, but it was difficult to correctly set the required coefficients, as the corresponding state with respect to the deviation of density was hard to discriminate.

Taking the foregoing drawbacks into account, in this third embodiment, a special scale corresponding to a variation width of density is additionally prepared for each color, in order to improve the working property.

As indicated in FIG. 13, an average coefficient of zero is set as a default value in advance, and a width of coefficient is determined from the abovementioned setting in such a manner that a density step would correspond to 0.05. In addition, a corresponding table is obtained as a result of the conversion of coefficient from a default condition, in which the direction that the image density increases is specified as a plus side, is prepared. The corresponding table is stored in a ROM (not shown) connected to the CPU 28.

FIG. 12 shows a console panel used to set plus or minus values for each color within the range of the corresponding table in FIG. 13.

As clearly understood from the foregoing, the controllability of the image forming device may be improved by providing such man-machine interface as described above. In addition, since adjustment is possible for every color, fine adjustment of coloring can readily be performed.

As explained above, according to the present invention, there would be attained such effects that the variation in density and gradation property among the machine bodies are appreciably reduced by selectively setting the coefficients used in its operation from the consol panel on the image forming device having the gradation control means which measures the reflected light of a specific pattern formed on an image carrier, performs arithmetic processing based on the measured quantity, converts the results of the processing into optical density, and implements gradation control in accordance with the optical density.

Like these, according to the present invention, there can be provided an image processing apparatus in which a stabilized excellent image is obtained and its maniputalability is highly improved.

[Embodiment: 4]

This embodiment utilizes a gradation reproduction means employing pulse-width modulation processing wherein the pixels for all colors are arranged in a sub-scanning direction.

A gradation image in this case is obtained through development, transcription and fixing processes after forming the latent image having gradation property due to a change in dot area on the photosensitive body drum 4 (FIG. 1) through laser scanning.

An image forming device suitable for this embodiment contains a test pattern generator 29 for providing a test pattern on the photosensitive body drum 4 like the former embodiments.

By the way, if the original image is composed of mesh points and the same gradation reproduction method is used for all colors, undesirable interference may occur among image signals, thereby resulting in image defects called the moire phenomena.

However, this type of moire phenomena may be suppressed by changing a reproduction method (for example, cycle or phase of a triangular wave used as a reference wave for pulse-width modulation) by utilizing gradation reproduction means suitable for individual color.

In general, in the case where mechanical vibrations appeared upon successively performing a series of developments for four colors which differ from color to color, there is a moire phenomena due to color deviation, but it may also be suppressed by use of this approach (an appropriately modified reproduction method).

In this embodiment, alignment angles (screen angles) for constitutional pixels were set to 0° (yellow), 45° (magenta), 0° (cyan) and 26.5° (black), as indicated in FIG. 17, by shifting synchronization of pulses in the gradation reproduction means by utilizing pulse-width conversion.

FIG. 22 is a block diagram showing the construction of a pulse-width modulation circuit used in this embodiment.

A multi-color image signal A (in this embodiment, a digital signal which is frame-sequentially transmitted with respect to each color M, C, Y or Br) is converted to an analog signal "a" by a D/A converter 201 for every color component. Whereas, the reference signal "b" (in this embodiment, triangular wave) which is individually defined for every color component is produced through the control of a CPU 203 by using clock pulses frequency-divided from high speed clocks by means of a pulse pattern generator 202. This reference signal "b" is delayed through a delay line 206 comprising eight (8) types of delay patterns each selected by a selector 207.

In this embodiment, a one-fourth (¼) pixel delay is specified as one unit of the amount of delay and 8 units are used in all.

In addition, one unit of pulse-width modulation (PWM) corresponding to the reference contains two pixels, and the eight kinds of delay patterns correspond to patterns of PWM signals (not shown) delayed up to 0/4–7/4 pixels, respectively.

One of the eight kinds of delay patterns is assigned to the signal of Y, M, C or Bk in advance, and a selector 207 selects a delay pattern corresponding to each line for Y, M, C or Bk. The selector 207 receives delay pattern information every one line from a phase variation quantity pattern generator 204 according to an instruction from the CPU 203. In this embodiment, the pattern generator 204 is composed of a RAM and includes delay pattern information to be selected every one line for each color. A counter 205 is constituted so as to count horizontal sync signals repetitively from 1 to 8 every one line. The sequential selector 207 selects a delay pattern according to the delay pattern stored in the pattern generator 204 each time the counter 205 implements a counting operation and outputs it as the reference signal "c". One unit for a triangular wave contains two pixels (that is, one cycle of a triangular wave corresponds to two pixels), and one unit for delay quantity is in accord with ¼ pixel. The analog signal "a" is compared with the reference signal "c" by a comparator 208 to obtain a PWM signal "d", and an amplifier 209 amplifies the PWM signal "d" and outputs it as processing signal "B".

The abovementioned operation is performed for each color component. In other words, the M components are not delayed in respect of the odd number lines, but delayed by ¼ pixel to obtain a screen angle of 45°. The C and Y components are not delayed in respect to all the lines to obtain a screen angle of 0°. The Bk components are not delayed in respect to No. i+1 lines (i=0, 1, 2 . . . ), but delayed by 2/4 pixel in respect to No. i+2 lines and by 6/4 pixel in respect to No. i+4 lines, respectively, to obtain a screen angle of 26.5. In this way, each color is output as a multiple image by using the abovementioned full color copier.

Like these, such defects as nonuniformity of color can be eliminated by making the screen angles in the formation of images for the first and fourth colors different from the screen angles for the second color and the third color.

As clearly understood from the foregoing, the present invention is based on the fact that the reflection characteristic of a toner on the photosensitive body drum differs depending on the screen angles set as above.

FIG. 18 shows a conversion table used for converting a reflected light quantity signal of magenta into optical density.

A solid line represents a conversion table in the case where the alignment angle for the constitutional pixels is set to 45°, and a broken line is that of 0°.

An amount of toner on the photosensitive body can precisely be detected by making up the conversion table for converting the reflected light quantity signal into optical density in accord with a screen angle for every color.

FIG. 19 shows one example of a conversion table for black.

A solid line represents a conversion table in the case where the alignment angle for the constitutional pixels is set to 26.5°, and a broken line is that of 0°.

In this embodiment, improvements in the accuracy of density conversion for all colors as well as the accuracy of gradation control using that value can be achieved by changing the shape of the conversion table in accordance with the alignment angle (screen angle) of the constitutional pixel for an individual color.

A signal processing circuit for this embodiment is indicated in FIG. 4. The near infrared light incident on the sensor 9 is converted to an electric signal. The electric signal is also converted into a digital signal of 0–255 levels (0–5 V) at the A/D converter 41 and then converted into a density signal at the density conversion circuit 42.

As color toners included in this embodiment, yellow, magenta and cyan are used and dispersed individually. A styrene-series copolymer resin is used as a binder.

Figure 5:
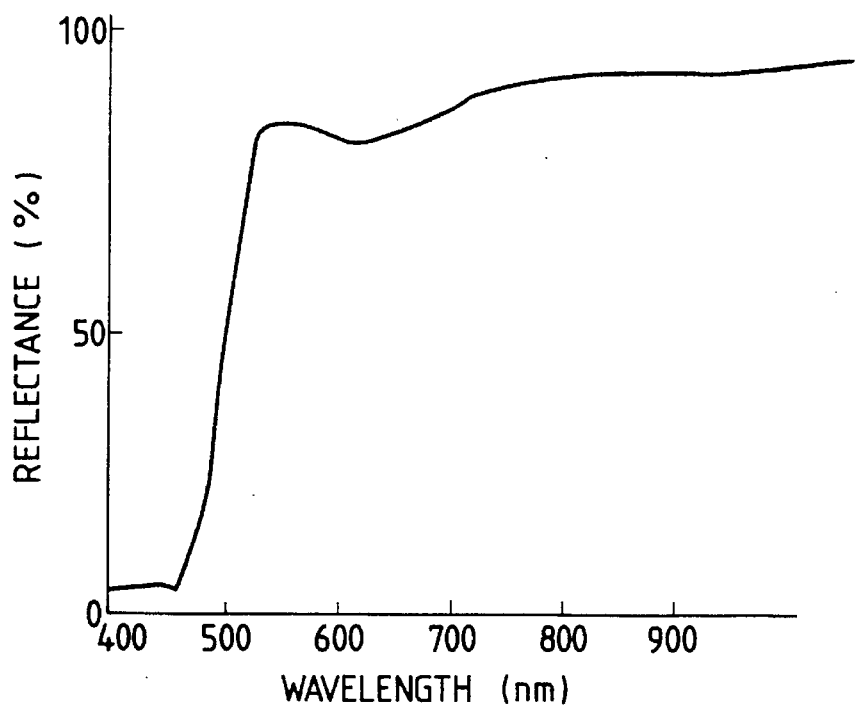
FIG. 5 is a diagram illustrating one example of yellow-toner spectral characteristic.
Figure 6:
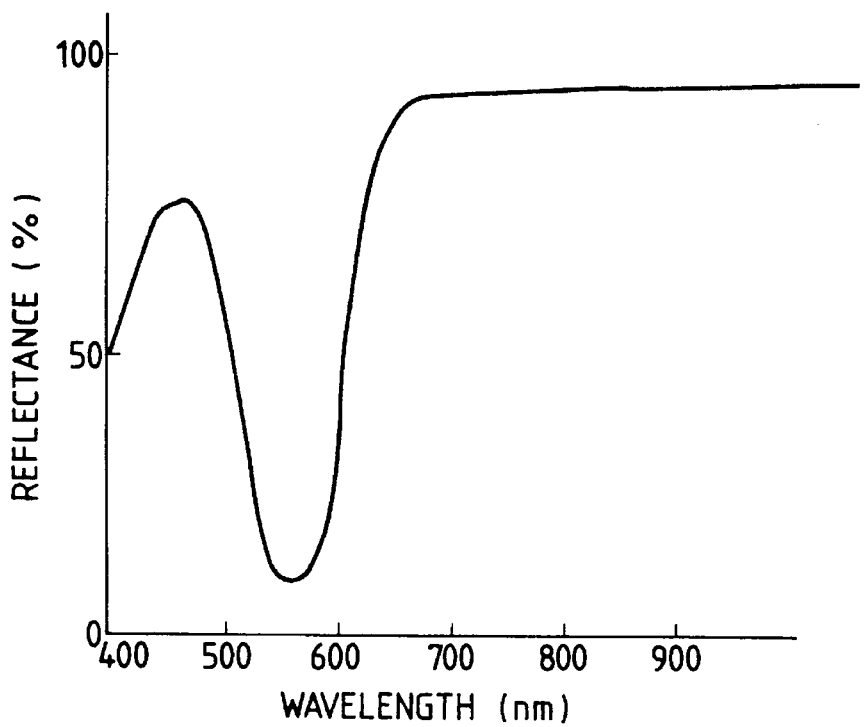
FIG. 6 is a diagram illustrating one example of magenta-toner spectral characteristic.
Figure 7:
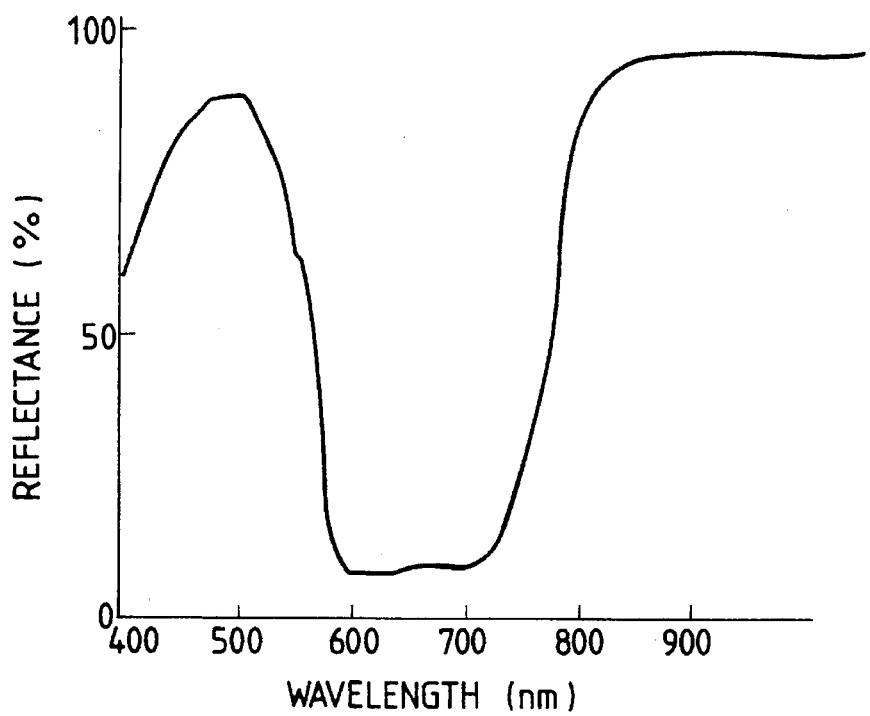
FIG. 7 is a diagram illustrating one example of cyan-toner spectral characteristic.
Figure 8:
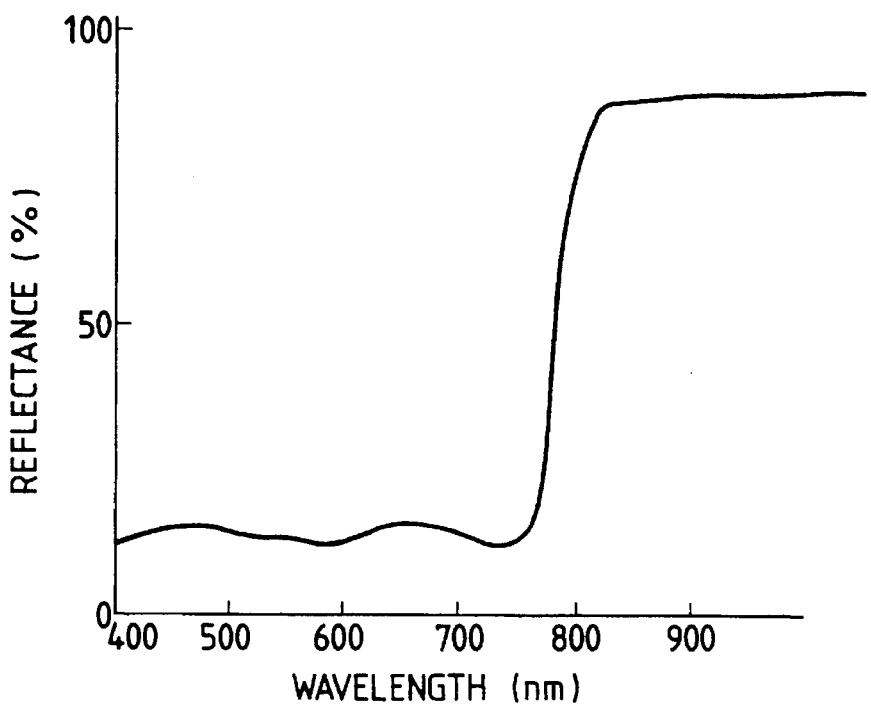
FIG. 8 is a diagram illustrating one example of black (one-component magnetism)-toner spectral characteristic.

As seen from the spectral characteristic for yellow, magenta and cyan toners indicated in this order in FIGS. 5–7, the reflectivity of near infrared light (960 nm) is more than 80%. In addition, in the formation of color toner image, a two-component developing system is employed because it is particularly advantageous for color fineness and transmittency.

On the other hand, the black toner used in this embodiment is a one-component magnetic toner which showed satisfactory results in the reduction in a running cost for monochromatic copying, and the reflectivity of rear infrared light (960 nm) is approximately 10%. For a black toner, one-component jumping developing system is employed, but a two-component toner of black may be used as well.

In addition, the photosensitive drum 4 is an OPC drum, and the reflectivity of near infrared light (960 nm) is approximately 40%. However, instead of the OPC drum, other drums such as amorphous silicon type drum or the like may be used.

In FIG. 15, there is shown the relationship between the output image density and the output of sensor 9 that is obtained when the density on the photosensitive drum is gradually changed according to an area gradation for each color. The output of sensor 9 under conditions where no toner is provided on the drum 4 was set to 2.5 V (128 levels).

As can be understood from FIG. 15, the output of sensor 9 for color toners including yellow, magenta and cyan becomes larger than the photosensitive drum 4 itself as its area coating ratio becomes larger. Contrary to this, in the case of a black toner, the output of sensor 9 becomes smaller than the photosensitive drum 4 itself.

Since the ROM connected to the CPU 28 stores a table dedicated to each color which is used for converting the output signal of sensor 9 for a respective color indicated in FIG. 16 into a density signal, based on the differences in the reflection characteristics for every colored toner, the density signal for each color can be accurately read out.

Before effecting a copying operation, a specific gradation pattern (25 laser output signal in this embodiment, a pattern of 10 gradations consisting of 16, 32, 48, 64, 80, 96, 112, 128, 144 and 160 levels is output) is formed continuously in the peripheral direction of the drum as indicated in FIG. 16, and is measured by using the LED 8, the sensor 9 and an appropriate timing to obtain a series of density values. The printer characteristic indicated in the third quadrant (III) in FIG. 3 representing its gradation characteristic is directly obtained with high accuracy by transcribing the series of density values on a copying paper without a need for a fixing process.

The contents of the LUT 25 used for correcting the printer characteristic can be readily derived from the printer characteristics obtained from the abovementioned measurement. In short, the LUT 25 can be derived by reversing the input-output relationship of the printer characteristic.

It is generally known that various characteristics in the copier of an electrophotographic system varies depending on the number of copies made. This is considered to be attributable to a number of causes such as fatigue of the photosensitive body due to light, abrasion of the superficial layer of the photosensitive body due to a cleaning blade abutting thereto, lowering of a tribo-provision capability for a developer and the like.

Accordingly, an optimum gradation reproduction property can always be obtained by performing the abovementioned operation periodically prior to a copying operation and deriving the LUT 25 step by step.

As explained above, according to the present invention, since the reference image upon constituting the feedback system, is formed on the medium by using the same gradation reproduction method as the gradation reproduction method for the image data input therein, highly accurate gradation control corresponding to the desired gradation reproduction method will become possible.

In addition, the density of the reference image formed on the medium in correspondence with the gradation reproduction method will also be precisely detected.

[Embodiment: 5]

The gradation reproduction method in this embodiment is constituted by combination of a dither method and the pulse width conversion method.

More specifically, the gradation property for yellow is reproduced by selectively switching two dither matrix patterns indicated in FIGS. 20A and 20B, using the method disclosed in the Japanese Patent Application Laid-open No. 1-204742. The full color image was constituted with an alignment angle of 0° for magenta, 45° for cyan and 22.5° for black, by using the pulse width conversion.

While the dither matrix was used in this embodiment, other types of dither matrixes and an intermediate tone processing method due to an error diffusion method or the like may also be used.

Like these, interference of the reproduced pixels for respective color, moire phenomena and color deviation can be prevented or suppressed by employing a plurality of gradation reproduction means for every color.

In FIG. 21, there is shown a conversion table for converting the reflection light quantity from the toner on the photosensitive drum for each color into optical density.

In this embodiment, since the shape of the conversion table is changed according to the alignment angles for constitutional pixels and gradation reproduction means for individual color, accuracy of density conversion for all colors as well as of gradation control using this value can be highly improved.

From the foregoing, it will be understood that the present invention can accomplish improvements on accurate conversion of optical density as well as on gradation control using this value.

The present invention is not restricted to the embodiments mentioned above, various modifications and applications may be made within the scope of the description in the appended claims.

In particular, it will be understood that the combination of the embodiments mentioned above will be included within the range of idea of this invention.

What is claimed is:

1. An image processing apparatus comprising:

pattern forming means for forming a predetermined gradation pattern on a medium;

detecting means for detecting the predetermined gradation pattern on the medium and generating a detection signal;

processing means for processing input image signals and outputting a reproduction signal;

control means for automatically controlling an image processing condition of said processing means based on the detection signal generated by said detecting means so that a target density is reproduced; and setting means for manually setting the target density to be reproduced, wherein a condition of a feedback system formed by said pattern forming means, said detecting means and said processing means is determined automatically in accordance with the target density set by said setting means.

2. An image processing apparatus according to claim 1, wherein said pattern forming means includes a photosensitive body.

3. An image processing apparatus according to claim 1, wherein said detecting means comprises means for irradiating near infrared light, and a CCD sensor.

4. An image processing apparatus according to claim 1, wherein said processing means includes γ-correction means.

5. An image processing apparatus according to claim 4, wherein said γ-correction means is composed of a look-up-table.

6. An image processing apparatus according to claim 1, wherein said processing means processes the input image signals to obtain a plurality of color component signals to obtain a plurality of color component signals, and outputs the color component signals as reproduction signals.

7. An image processing apparatus according to claim 6, wherein said setting means sets a processing condition for said color component signals.

8. An image processing apparatus according to claim 1, further comprising display means for indicating the processing condition.

9. An image processing apparatus according to claim 8, wherein said display means indicates a plurality of processing conditions corresponding to a plurality of color component signals respectively.

10. An image processing method comprising the steps of:

forming a predetermined gradation pattern on a medium by a pattern forming means;

detecting the predetermined gradation pattern on the medium and generating a detection signal by a detecting means;

processing input image signals and outputting a reproduction signal by a processing means;

automatically controlling an image processing condition of said processing step based on the detection signal so that a target density is reproduced; and manually setting the target density to be reproduced, wherein a condition of a feedback system formed by the forming means, the detecting means and the processing means is determined automatically in accordance with the manually set target density.

11. An image processing apparatus comprising:

input means for inputting image data;

converting means for converting a density characteristic of the image data;

generating means for generating pattern data representing a predetermined gradation pattern;

image forming means for forming an image on a recording medium in accordance with the converted image data and the pattern data;

detecting means for detecting the predetermined gradation pattern on the recording medium and generating a detection signal;

control means for automatically controlling a conversion characteristic of said converting means based on the detection signal so that a target density is reproduced; and setting means for manually setting the target density to be reproduced, wherein a condition of a feedback system formed by said generating means, said image forming means and said detecting means is determined automatically in accordance with the target density set by said setting means.

12. An image processing apparatus according to claim 11, wherein said input means is an image reader comprising a CCD line sensor.

13. An image processing apparatus according to claim 11, said converting means is composed of a look-up-table.

14. An image processing apparatus according to claim 11, wherein said detecting means comprises means for irradiating near infrared light, and a CCD sensor.

15. An image processing apparatus according to claim 11, further comprising display means for indicating the processing condition.

16. An image processing apparatus according to claim 15, wherein said display means indicates a plurality of processing conditions corresponding to a plurality of color component signals respectively.

17. An image processing apparatus comprising:

pattern forming means for forming a predetermined pattern on a medium;

density detecting means for detecting a density of the pattern formed by said pattern forming means; and gradation control means for performing gradation control according to the density detected by said density detecting means by using a selected one of a plurality of gradation reproduction methods, wherein said density detecting means comprises a light source and light reception elements which measure the reflected light of the pattern formed on the medium and performs arithmetic processing for converting the measured value of the reflected light into a corresponding density value in accordance with the selected gradation reproduction method.

18. An image processing apparatus according to claim 17, said gradation control means performs pulse width modulation.

19. An image processing apparatus according to claim 18, said gradation control method is of such a nature that a screen angle is formed in the pulse width modulation.

20. An image processing apparatus according to claim 17, further comprising memory means for storing a table for said arithmetic processing.

* * * * *

UNITED STATES PATENT AND TRADEMARK OFFICE
CERTIFICATE OF CORRECTION

PATENT NO. : 5,572,330

DATED : November 5, 1996

INVENTOR : NOBUATSU SASANUMA

It is certified that error appears in the above-identified patent and that said Letters Patent is hereby corrected as shown below:

COLUMN 4

Line 12, "(look-up-table)" should read --(look-up table);
Line 46, "LUT 25" should read --the LUT 25--.

COLUMN 5

Line 18, "relationship," should read --relationships,--;
Line 27, "equation;" should read --equation:--.

COLUMN 6

Line 2, "varies" should read --vary--;
Line 22, "consol" should read --console--;

COLUMN 7

Line 1, "consol" should read --console--;
Line 40, "consol" should read --console--;
Line 49, "maniputalabil" should read --manipulatability--;
Line 50, "ity" should be deleted.

UNITED STATES PATENT AND TRADEMARK OFFICE
CERTIFICATE OF CORRECTION

PATENT NO. : 5,572,330

DATED : November 5, 1996

INVENTOR : NOBUATSU SASANUMA

Page 2 of 3

It is certified that error appears in the above-identified patent and that said Letters Patent is hereby corrected as shown below:

COLUMN 8

Line 26, "Br)" should read --Bk)--;
Line 29, "triangular" should read --a triangular--.

COLUMN 9

Line 7, "26.5." should read --26.5°.--;
Line 59, "rear" should read --near--.

COLUMN 10

Line 20, "(25" should read --(as a--;
Line 38, "varies" should read --vary--.

COLUMN 11

Line 27, "above," should read --above and--;
Line 63, "look-up-" should read --look-up--;
Line 67, "signals to" (second occurrence) should read --signals,--.

UNITED STATES PATENT AND TRADEMARK OFFICE
CERTIFICATE OF CORRECTION

PATENT NO. : 5,572,330

DATED : November 5, 1996

INVENTOR : NOBUATSU SASANUMA

Page 3 of 3

It is certified that error appears in the above-identified patent and that said Letters Patent is hereby corrected as shown below:

COLUMN 12

Line 1, "obtain a plurality of color component signals," should be deleted.

Line 57, "said" should read --wherein said-- and "look-up-table." should read --look-up table.--.

COLUMN 14

Line 5, "said" should read --wherein said--;
Line 8, "said" should read --wherein said--.

Signed and Sealed this

Twenty-ninth Day of April, 1997

Attest:

BRUCE LEHMAN

Attesting Officer

Commissioner of Patents and Trademarks